United States Patent
Zhang et al.

(10) Patent No.: US 9,292,134 B2
(45) Date of Patent: Mar. 22, 2016

(54) METHOD AND DEVICE FOR TOUCH IDENTIFICATION, AND TOUCH SCREEN

(71) Applicant: Shanghai Jingyan Electronic Technology Co. Ltd, Shanghai (CN)

(72) Inventors: Yuming Zhang, Shanghai (CN); Lei Zhao, Shanghai (CN); Jiao Xu, Shanghai (CN)

(73) Assignee: SHANGHAI JINGYAN ELECTRONIC TECHNOLOGY CO. LTD, Shanghai (CN)

( * ) Notice: Subject to any disclaimer, the term of this patent is extended or adjusted under 35 U.S.C. 154(b) by 65 days.

(21) Appl. No.: 14/252,753

(22) Filed: Apr. 14, 2014

(65) Prior Publication Data

US 2014/0354563 A1   Dec. 4, 2014

(30) Foreign Application Priority Data

May 31, 2013 (CN) .......................... 2013 1 0214627

(51) Int. Cl.
  *G06F 3/041* (2006.01)
  *G06F 3/042* (2006.01)
(52) U.S. Cl.
  CPC ............ *G06F 3/0421* (2013.01); *G06F 3/0418* (2013.01)

(58) Field of Classification Search
  None
  See application file for complete search history.

(56) References Cited

U.S. PATENT DOCUMENTS

2011/0157096 A1* 6/2011 Drumm .......................... 345/175
2012/0105377 A1* 5/2012 Takeno et al. .................. 345/175

* cited by examiner

*Primary Examiner* — Joseph Haley
(74) *Attorney, Agent, or Firm* — Kilpatrick Townsend & Stockton LLP (57) ABSTRACT

Method and device for touch identification, and a touch screen are provided. The method includes: performing an axial scanning on a touch screen, and when a touch region is detected, recording scanning axes with scanning rays shielded; corresponding to the detected touch region, according to axial directions, obtaining sets of intersections of the scanning axes with scanning rays shielded; calculating a confidence level for each of the intersection in each set of intersections; and performing a coordinate fusion to all the sets of intersections which correspond to the touch region based on the confidence levels to obtain positions of the touch region. The device includes a scanning record unit, an intersection unit, a calculation unit and a coordinate fusion unit. In the present disclosure, an effective touch region on a touch screen may be better identified.

19 Claims, 10 Drawing Sheets

METHOD AND DEVICE FOR TOUCH IDENTIFICATION, AND TOUCH SCREEN

CROSS-REFERENCE TO RELATED APPLICATIONS

The present application claims priority to Chinese patent application No. 201310214627.2, filed on May 31, 2013, and entitled "METHOD AND DEVICE FOR TOUCH IDENTIFICATION, AND TOUCH SCREEN", and the entire disclosure of which is incorporated herein by reference.

FIELD OF THE DISCLOSURE

The present disclosure generally relates to computer touch and control, and more particularly, to a method and device for touch identification, and a touch screen.

BACKGROUND OF THE DISCLOSURE

Infrared touch screens, as a kind of computer touch screen, are humanized in inputting and thus have a broad application prospect. For example, infrared touch screens are easy to be installed and maintained, and have strong anti-explosion capability and high reliability, so they are widely used in devices in current various fields.

An infrared touch screen basically includes a plurality of couples of an infrared emitter and an infrared receiver installed in a certain order at surrounding edges of a display surface. The infrared emitters and receivers, which appear in emitter-receiver pair, constitute an emitting array and a receiving array which are perpendicular to each other. When detecting touch events, a computer system connects each pair of infrared emitter and receiver in a certain order, and determines whether infrared-rays between each pair of infrared emitter and receiver are shielded.

In conventional solutions, a method fir identifying a touch point on a touch screen includes: starting an infrared touch screen; connecting each pair of infrared emitter and receiver successively, and scanning the whole touch region; recording and storing internal coordinates of the pair of infrared emitter and receiver where infrared-rays shielding happens; obtaining and storing coordinates of a touch point based on the recorded internal coordinates; converting the coordinates of the touch point into data suitable for being received by a computer system configured with the touch screen; and transmitting the convened data to the computer system through an interface of the touch screen.

In above touch screen, there are gaps between infrared-rays in different pairs of infrared emitter and receiver, and there are gaps between adjacent infrared emitters and between adjacent infrared receivers. Therefore, infrared scanning rays form a grid layout in the touch region. Due to the gaps in the grid, when a touch point, particularly a fine touch point (for example, formed by a fine contact terminal such as a finger of a minor, or a nib), falls into the gaps, the point cannot shield infrared scanning rays between a pair of infrared emitter and receiver, that is, the touch event cannot be detected because of a lack of direct-axis data. Therefore, in conventional solutions, a valid touch point may not be detected due to a scanning environment, which may result in a loss for touch point data and performance degradation.

SUMMARY

Embodiments of the present disclosure provide a method and device for better identifying a touch region on a touch screen.

In one embodiment of the present disclosure, a method for touch identification is provided including: performing an axial scanning on a touch screen, and when a touch region is detected, recording scanning axes with scanning rays shielded; corresponding to the detected touch region, according to axial directions, obtaining sets of intersections of the scanning axes with scanning rays shielded; calculating a confidence level for each of the intersection in each set of intersections; and performing a coordinate fusion to all the sets of intersections which correspond to the touch region based on the confidence levels to obtain positions of the touch region.

Optionally, performing an axial scanning on a touch screen may include: initializing arrays of emitting component and arrays of receiving component and determining a number of scanning axis and a scanning deflection angle; and connecting an emitting component and a corresponding receiving component to perform direct-axis scanning or off-axis scanning with the determined number of scanning axis and the determined scanning deflection angle.

Optionally, the scanning axes with scanning rays shielded pray be obtained by recording an axial position corresponding to the touch region.

Optionally, the axial position corresponding to the touch region includes a start position and an end position of the touch region on an axis, or includes the start position and width of the touch region on the axis, or includes width and the end position of the touch region on the axis.

Optionally, corresponding to the touch region, according to axial directions, obtaining sets of intersections of the scanning axes with scanning rays shielded may include: for each axial direction, obtaining lines corresponding to the scanning axes with scanning rays shielded; and obtaining intersections of the lines.

Optionally, the confidence level of a particular intersection in a set of intersections may be a sum of an initial value of the confidence level of the particular intersection and a number of other intersections which have distances to the particular intersection less than or equal to a first predetermined distance in the set.

Optionally, performing coordinate fusion to all the sets of intersections which correspond to the touch region based on the confidence levels to obtain positions of the touch region may include: selecting a particular intersection from each set of intersections based on its confidence level and a distance between the particular intersection and intersections in other sets of intersections; and weighting coordinates of the selected intersections from all the sets of intersections which correspond to a same touch region and have different axial directions to obtain positions of the touch region, where a weight value of a selected intersection is the confidence level of the selected intersection.

Optionally, selecting a particular intersection from each set of intersections may include: selecting an intersection having a highest confidence level in a set of intersections; and if there are a plurality of intersections having a same highest confidence level in the set of intersections, selecting one from the plurality of intersections which has a shortest distance to intersections having highest confidence level in other sets of intersections.

Optionally, a coordinate of one of the selected intersections which correspond to a same touch region and have different axial directions may be an average value of coordinates of the selected intersection in a set of intersections and other at least one intersection in the set of intersections, where a distance between the intersection and each of the other at least one intersection in the set is shorter than or equal to a second predetermined distance.

Optionally, weighting coordinates of the selected intersections from all the sets of intersections which correspond to a same touch region and have different axial directions to obtain positions of the touch region may be performed based on following equation:

$$P.k = \sum_{n=1}^{N} (Cn \times Pn.k) \bigg/ \sum_{n=1}^{N} Cn$$

where P corresponds to a touch region, P.k is a coordinate of the touch region on the k-axis, Pn is a selected intersection which is selected from a $n^{th}$ set of intersections in sets of intersections which correspond to the touch region and have different axial directions, N is the number of the different axial directions, Pn.k is a coordinate of the selected intersection Pn on the k-axis, and Cn is a confidence level of the selected intersection Pn.

In one embodiment, a device for touch identification is provided, including: a scanning record unit, adapted to perform an axial scanning a touch screen and when a touch region is detected, record scanning axes with scanning rays shielded; an intersection unit, adapted to, according to axial directions, obtain sets of intersections of the scanning axes with scanning rays shielded, corresponding to the detected touch region; a calculation unit, adapted to calculate a confidence level for each of the intersection in each set of intersections; and a coordinate fusion unit, adapted to perform a coordinate fusion to all the sets of intersections which correspond to the touch region based on the confidence levels to obtain positions of the touch region.

In one embodiment, a touch screen is provided, including a touch region and a micro processor, where the micro processor includes a device for touch identification provided in embodiments of the present disclosure.

Compared with the conventional solutions, the present disclosure may have following advantages. In the present disclosure, a touch screen is scanned using a direct-axis scanning mode and an off-axis scanning mode with a plurality of angles. Scanning rays are emitted from the plurality of angles, thus, even a very small touch region may be detected, which avoids loss of effective touch data on a touch screen, in consideration that a touch region has a certain area on the touch screen, to some touch regions which have small area, accurate positions of these touch regions may not be accurately determined based on shielded scanning rays. In the present disclosure, confidence levels of intersections of scanning axes are employed, and coordinate fusion is performed to sets of intersections which correspond to a same touch region and have different axial directions, thereby greatly improving accuracy of touch identification, effectiveness of touch data, and performance of devices provided with a touch screen.

In existing techniques, a scanning axis has a certain width, thus, intersections of scanning axes may not be obtained easily and touch regions may not be identified accurately. In the present disclosure, central lines of scanning axes are obtained and intersections of these central lines are further obtained to improve accuracy in touch identification. Compared with existing techniques where intersections are obtained based on intersected regions of scanning axes, processing efficiency is improved.

Further, a confidence level of an intersection is the number of other intersections which have distances to the intersection less than or equal to a predetermined distance. Thus, an error between actual positions of the touch region and positions of intersections is relatively low, which ensures accuracy of intersection selection during a coordinate fusion process.

In some embodiments, a coordinate of a selected intersection is an average value of coordinates of the selected intersection and other intersections which have a distance not longer than a predetermined distance with the selected intersection, which improves accuracy of touch identification.

Methods for touch identification in embodiments of the present disclosure are easy to realize, and can be realized merely based on information about axis scanning. The methods for touch identification have simple logic, thus, it is easy to realize hardware acceleration. Besides, there is no need to change structures of a touch screen, which results in a low application cost and broad applications. Especially for some special applications, such as a special touch form (not limited to a touch point), positions of touch regions may be still determined accurately.

DETAILED DESCRIPTION OF THE DISCLOSURE

Figure 1:
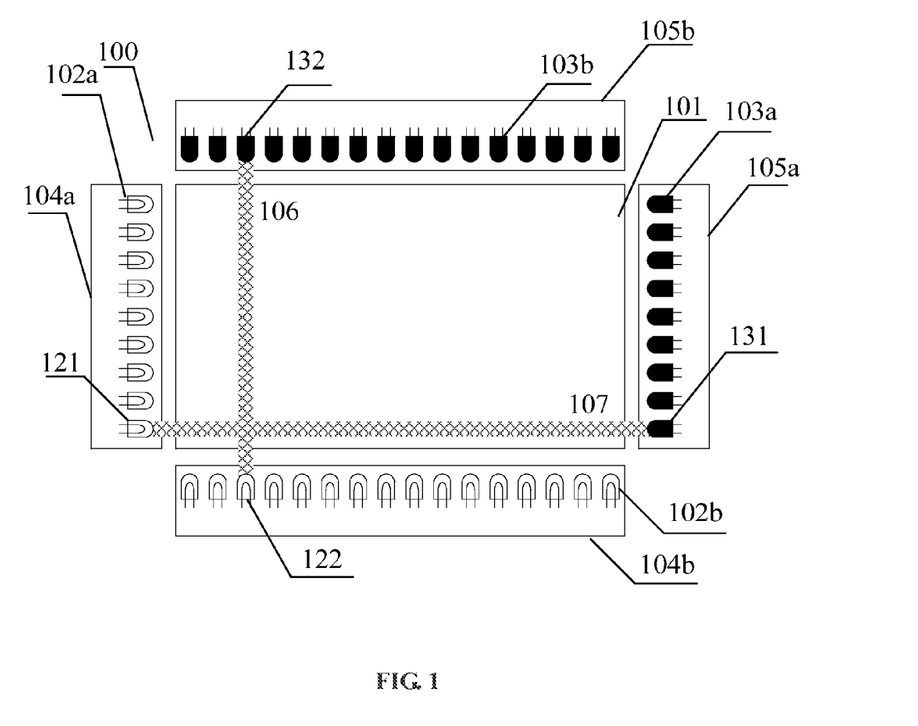
FIG. 1 schematically illustrates a structural diagram of a touch device.

A touch device 100 is illustrated in FIG. 1. The touch device 100 takes a shape of rectangle and arrays of emitting components (102a and 102b) and arrays of receiving components (103a and 103b) are installed at surrounding edges of the touch device 100. A touch screen 101 may be a display region of a computer display or a projector screen. The emitting components correspond to the receiving components in a one-to-one manner and constitute a plurality of emitting-receiving pairs. In practice, the arrays of emitting components 102a and 102b are mounted on emitting plates 104a and 104b respectively, and each emitting component is an emitting lamp which is adapted to emit infrared scanning rays. The arrays of receiving components 103a and 103b are mounted on receiving plates 105a and 105b respectively, and each receiving component is a receiving lamp which is adapted to receive infrared scanning rays.

A method for touch identification based on the touch device 100 includes following steps.

Generally, the touch screen 101 is scanned with a direct-axis scanning mode. Under the direct-axis scanning mode, scanning rays are emitted and received by emitting-receiving pairs. A scanning axis in direct-axis scanning mode represents a direction which is same as an optical axis of an emitting-receiving pair and is used to denote a region where scanning rays run through. Referring to FIG. 1, an emitting component 121 and a receiving component 131 constitute an emitting-receiving pair, and an emitting component 122 and a receiving component 132 constitute an emitting-receiving pair. Actual scanning rays has a certain width, thus, a scanning axis 107 generated by the emitting component 121 and the receiving component 131 and a scanning axis 106 generated by the emitting component 122 and the receiving component 132 have a certain width as well.

Figure 2:
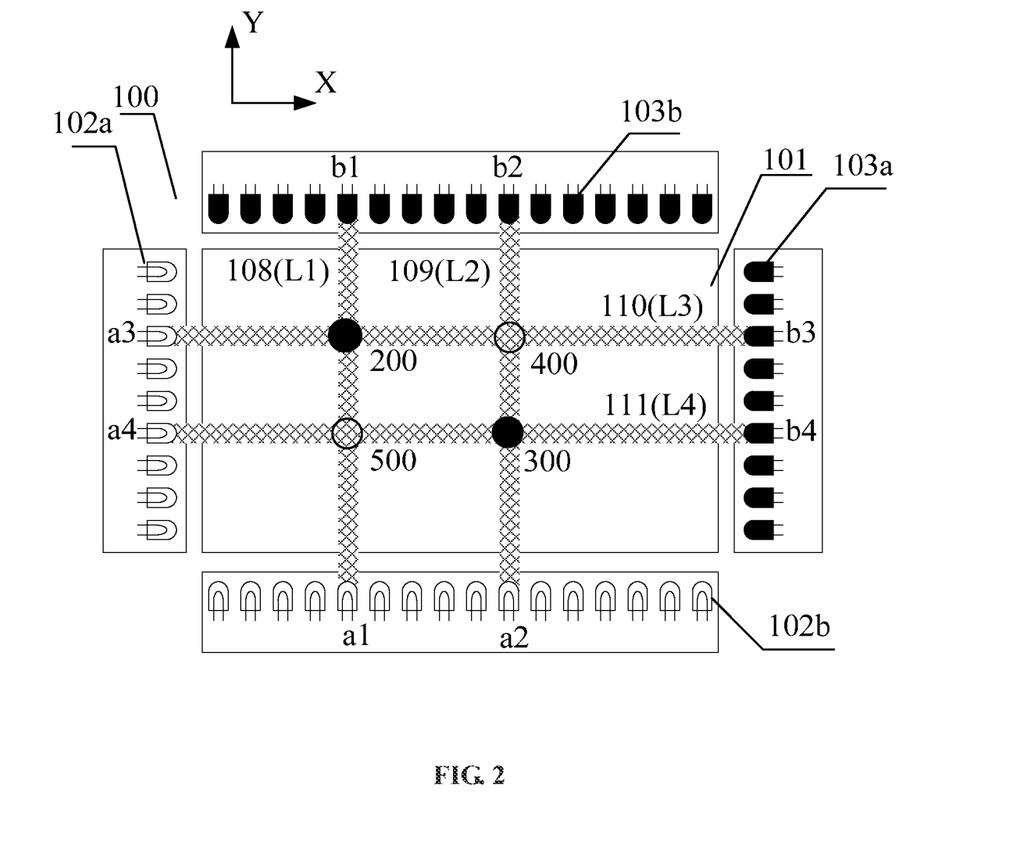
FIG. 2 schematically illustrates a first state of the touch device shown in FIG. 1 when in operation.

A situation that at least two points 200 and 300 on the touch screen 101 are touched is taken as an example. FIG. 2 schematically illustrates a first state of the touch device 100 shown in FIG. 1 when in operation.

Assume that rays in at least two emitting-receiving pairs in a horizontal direction are shielded and rays in at least two emitting-receiving pairs in a vertical direction are shielded. The horizontal direction and the vertical direction may be represented by an X-axis and a Y-axis in FIG. 2 respectively. FIG. 2, the point 200 shields the rays L1 and L3, and the point 300 shields the rays L2 and L4.

It should be noted that, rays being shielded means the whole rays being shielded or a portion of the rays being shielded. Data processing, including an ambient light removing process, a normalization process and etc., may be performed on scanning data to generate logic data of touch information of a scanning axis (direct-axis or an off-axis).

Still referring to FIG. 2, the shielded ray L1 corresponds to an emitting component a1 and a receiving component b1 the shielded ray L2 corresponds to an emitting component a2 and a receiving component b2, the shielded ay L3 corresponds to an emitting component a3 and a receiving component b3, and the shielded ray L4 corresponds to an emitting component a4 and a receiving component b4. The scanning axes 108 to 111 correspond to the shielded rays L1 to L4, respectively. Coordinates of an emitting component in the arrays of emitting components (102a and 102b) or a receiving component in the arrays of receiving components (103a and 103b) in an XOY coordinate system in a coordinate measurement unit may be determined according to a sequence number or a scanning address of the emitting component or the receiving component by a touch screen micro controller. Therefore, after the touch screen micro controller obtaining information about the emitting component and receiving component in an emitting-receiving pair where rays are shielded, horizontal coordinates and vertical coordinates of a touch region may be obtained.

In FIG. 2, when a sequence number of an emitting component the arrays of emitting components (102a and 102b) or a receiving component in the arrays of receiving components (103a and 103b) is taken as a corresponding coordinate in an XOY coordinate system in a coordinate measurement unit in a touch screen micro controller, four regions may be considered as touch regions, including 200, 300, 400 and 500. It can be seen from FIG. 2 that, regions 200 and 300 are actual touch regions while regions 400 and 500 are false touch regions.

A method for excluding false touch regions may include off-axis scanning. Under an off-axis scanning mode, scanning rays are emitted by an emitting component in one emitting-receiving pair and received by a receiving component in another emitting-receiving pair. A scanning axis in off-axis scanning mode represents a direction which has a certain angle with an optical axis of an emitting-receiving pair and is used to denote a region where scanning rays run through. Combining definition of the scanning axis in direct-axis scanning mode and the scanning axis in off-axis mode, a scanning axis in scanning may be used to denote a region where scanning rays run through and represent a direction which has a deflection angle with an optical axis of an emitting-receiving pair, where the deflection angle may be zero or greater than zero. It should be noted that, when the deflection angle is zero, the scanning is performed with a direct-axis mode.

Figure 3:
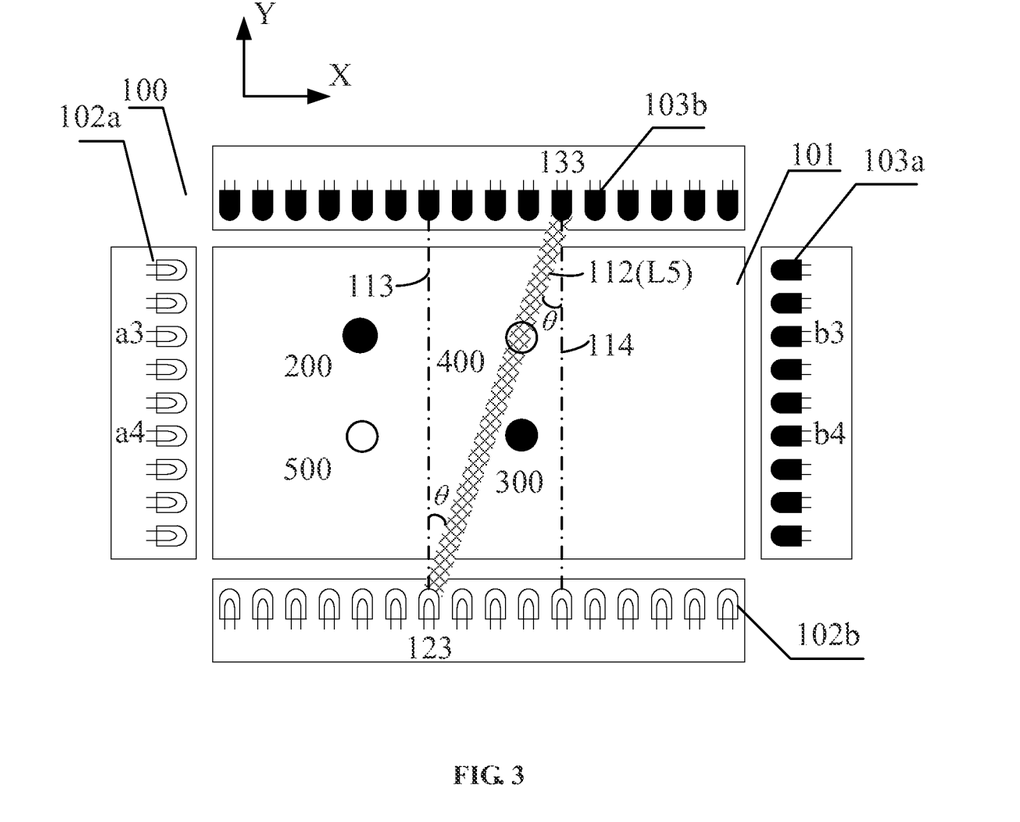
FIG. 3 schematically illustrates a second state of the touch device shown in FIG. 1 when in operation.

FIG. 3 schematically illustrates a second state of the touch device 100 when in operation. When a scanning region 101 is scanned with scanning rays which has a deflection angle $\theta$, the false touch regions 100 and 500 may be easily excluded. For example, rays L5 emitted by the emitting component 123 are not shielded by the touch region 400 and can be received by a receiving component 133, thus, the touch region 400 is a false touch region. And the touch screen micro processor may exclude internal coordinates of the false touch region 400. In FIG. 3, a scanning axis 112 of the rays L5 has a deflection angle $\theta$ with an optical axis 113 of the emitting-receiving pair where the emitting component 123 locates, and the scanning axis 112 of the rays L5 has the deflection angle $\theta$ with an optical axis 114 of the emitting-receiving pair where the receiving component 133 locates as well.

After the false touch regions are excluded by the off-axis scanning, positions of regions which have been touched can be determined based on the internal coordinates of the actual touch regions.

Figure 4:
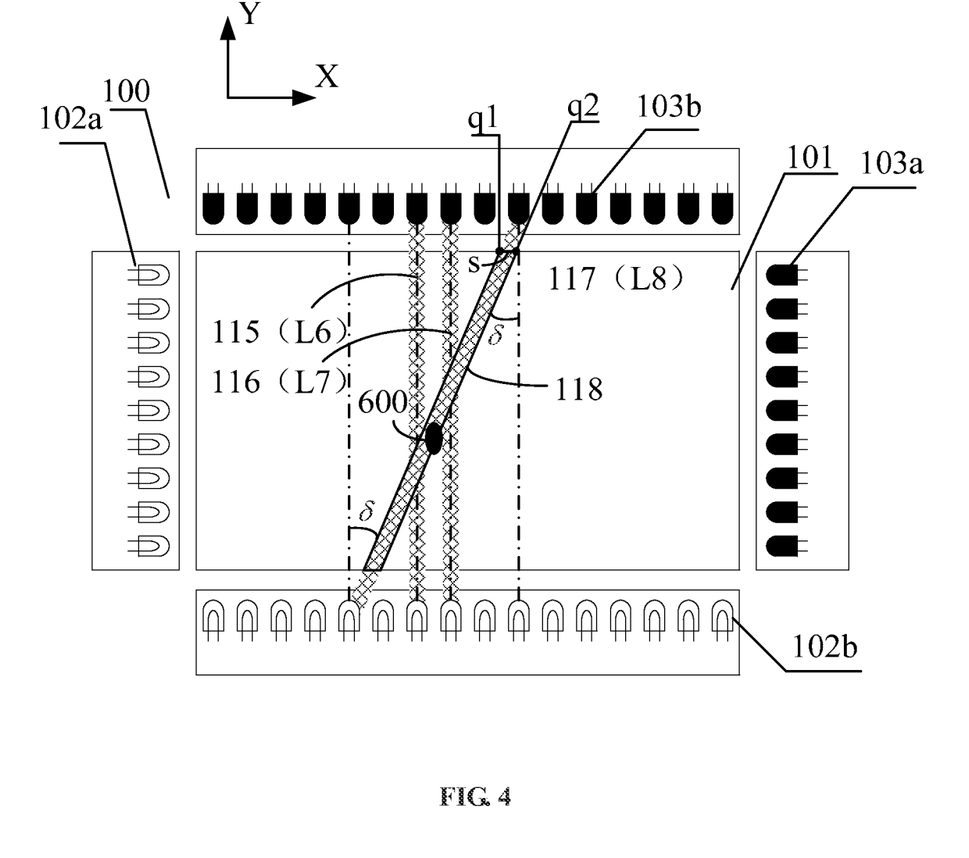
FIG. 4 schematically illustrates a third state of the touch device shown in FIG. 1 when in operation.

However, the above method has some drawbacks. FIG. 4 schematically illustrates a third state of the touch device 100 when in operation, where a touch region may not be detected with a direct-axis scanning mode. Referring to FIG. 4, a touch region 600 locates in a gap between rays L6 and L7 (L6 and L7 are scanning rays in directions of two adjacent optical axes, respectively). The touch region 600 is relatively small and cannot be entirely or partially shielded the rays L6 and L7, the touch screen micro controller cannot determine internal coordinates of the touch region 600 according to a sequence number or a scanning address of an emitting component or a receiving component, which may result in a loss of touch region data. Therefore, the above method for touch identification cannot detect touches between adjacent optical axes.

Based on above analysis, embodiments of the present disclosure provide a method for touch identification which can detect a touch region between adjacent optical axes.

Referring FIG. 2, coordinates of the receiving components b1 to b4 in the XOY coordinate system, which correspond to their sequence numbers or scanning addresses, are x1, x2, y1, y2 respectively. Thus, coordinates of the touch regions 200, 300, 400 and 500 are (x1, y1), (x2, y2), (x2, y1) and (x1, y2), respectively. Further, an off-axis scanning mode is used to exclude false touch regions 400 and 500 and effective touch regions are determined, i.e., touch regions 200 and 300.

As described above, in FIG. 4, under a direct-axis scanning mode, the relatively small touch region 600 in the gap between rays L6 and L7 cannot be detected, so that positions of the touch region 600 may not be determined. The inventor found that, the touch region 600 may shield scanning rays L8 which has a deflection angle $\delta$ with a scanning axis 117, so that the touch region 600 may be detected with an off-axis scanning mode. Scanning axis 117 of the scanning rays L8 is illustrated in FIG. 4.

However, if the off-axis scanning mode is employed to detect a touch event, following problems may exist. When a touch region cannot be detected with a direct-axis scanning mode, the off-axis scanning mode may be used to detect the touch region. Although the touch region may be detected, coordinates of the touch region in an XOY coordinated system in a touch screen micro controller still cannot be determined.

The inventors found that, under an off-axis scanning mode, coordinates of a touch region are hardly determined. The reason lies in that, a determined position of a touch region may be not an actual position thereof but an axial position of the touch region. Here, the axial position of the touch region may be defined as a coordinate of the receiving component which emits scanning rays in an internal coordinate system. When a direct-axis scanning mode is used to locate a detected touch region, horizontal and vertical coordinates of the detected touch region, i.e., an axial position of the touch region, may be obtained directly as actual positions of the detected touched point, and data obtained in the off-axis scanning process is not used in calculating coordinates of the touch region.

However, it is not easy to use the data obtained in the off-axis scanning process to calculate coordinates of the touch region, because of at least following problems.

First, when there are several points being touched on a touch screen, touched points are hardly located by an off-axis scanning process, since axial positions of the touched points are not equal to actual positions of the touched points.

Besides, a touch region has a certain area, thus, there may be several rays being shielded by the touch region under off-axis scanning mode, which results in a greater difficulty in locating.

In embodiments of the present disclosure, a touch screen is scanned with a direct-axis mode and an off-axis mode in turn in one scanning cycle to identity touch regions on the touch screen.

Figure 5:
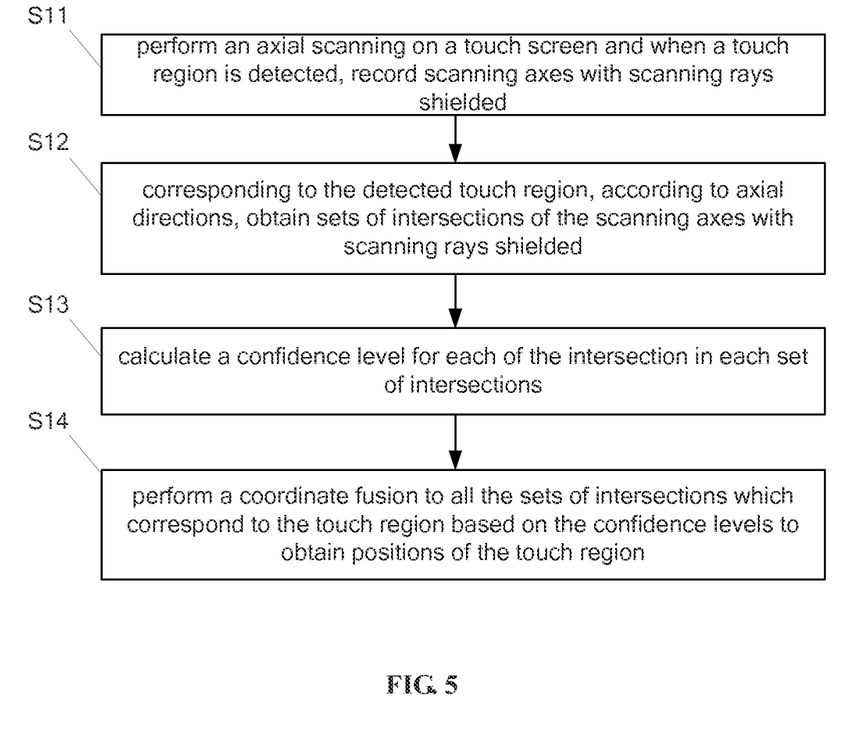
FIG. 5 schematically illustrates a flow chart of a method for touch identification according to one embodiment of the present disclosure.

FIG. 5 schematically illustrates a flow chart of a method for touch identification according to one embodiment of the present disclosure. The method includes S11, S12, S13 and S14.

In S11, perform an axial scanning on a touch screen and when a touch region is detected, record scanning axes with scanning rays shielded.

The scanning process includes direct-axis scanning and off-axis scanning performed in one scanning cycle. In the embodiment, both the direct-axis scanning and off-axis scanning are used for detecting and locating touch regions.

In some embodiments, performing an axial scanning on a touch screen may include: initializing arrays of emitting component and arrays of receiving component and determining a number of scanning axis and a scanning deflection angle; and connecting an emitting component and a corresponding receiving component to perform direct-axis scanning or off-axis scanning with the determined number of scanning axis and the determined scanning deflection angle.

In some embodiments, the scanning axis with scanning rays shielded may be obtained by recording an axial position corresponding to the touch region. The axial position corresponding to the touch region may denote to a position of the corresponding receiving component in an internal coordinate system. For a touch screen micro controller, any portion in a region of the scanning axis where scanning rays are shielded may be a touch region. The axial position of the touch region may serve as logic data of the scanning axis to facilitate calculation of a position of the touch region. Axial position information may be obtained by performing data processing, including an ambient light removing process, a normalization process and etc., on scanning data.

An axial position corresponding to a touch region may include a start position and an end position of the touch region on an axis, or include the start position and width of the touch region on the axis, or include width and the end position of the touch region on the axis. The scanning axis 117 in FIG. 4 is taken as an example. To the scanning axis 117, a start position of the touch region on the X-axis is q1 and an end position of the touch region on the X-axis is q2, and the width of the touch region on the X-axis is s. Logic data of the scanning axis 117 may be represented as (q1, q2), (q1, s) and (s, q2). Logic data of other scanning axes may be obtained similarly.

Further, the scanning axes with scanning rays shielded are described in detail. Since the scanning rays have a certain width, a portion of the touch screen 101 where the scanning axis locates is a parallelogram region. The parallelogram region may be defined based on logic data of the scanning axis. A base of the parallelogram region is the axial position of the touch region, and an angle between the base and a lateral side of the parallelogram region is a deflection angle of the scanning rays with scanning rays shielded. For example, in FIG. 4, the scanning axis 117 defines a parallelogram region 118. The axial position of the touch region 600 is regarded as a base of the parallelogram region 118. Therefore, a start position of the base of the parallelogram region 118 on the X-axis is q1, an end position thereof is q2, and an angle between the base and a lateral side of the parallelogram region 118 may be a complementary angle of the deflection angle δ of the scanning rays where scanning rays are shielded, i.e., π/2−δ.

In S12, corresponding to the detected touch region, according to axial directions, obtain sets of intersections of the scanning axes with scanning rays shielded.

As described above, an actual position of a touch region is hardly calculated based on an axial position of a touch region obtained by an off-axis scanning. The inventors found that, based on logic data of a scanning axis obtained by the axial position of the touch region obtained by the off-axis scanning, the actual position of the touch region may be calculated.

However, only based on intersections of scanning axes, the position of a touch region is hardly determined. That is because, two intersected scanning axes have countless intersections, and a touch region which has a relatively large area or has a slit shape may shield several scanning rays. As a result, a touch region is hardly located.

To solve the above problem, lines may be set in regions where the scanning axes locate. Each line has a same direction with the corresponding scanning axis. In some embodiments, one line may be set in a scanning axis to separate the scanning axis to be two parts equally. In some embodiments, two lines may be set in a scanning axis to separate the scanning axis to be three parts equally. In this manner, many intersections which do not exist in the touch region may be excluded and the position of the touch region may be determined more accurately. Besides, calculation for the position of the touch region may be simplified. In some embodiments, if the calculation amount is not taken into consideration, more than two lines may be set in each scanning axis.

In some embodiments, corresponding to the detected touch region, according to axial directions, obtaining sets of intersections of the scanning axes with scanning rays shielded may include: for each axial direction, obtaining central lines corresponding to the scanning axes with scanning rays shielded; and obtaining intersections of the central lines.

In above steps, the set of intersections correspond to a same touch region. S12 may further include: determining which intersections are corresponding to a same touch region and belong to a same set of intersection. In some embodiments, two intersections, which have a distance within a predetermined range therebetween, may be determined to belong to a same set of intersection. In some embodiments, a deflection angle of scanning rays and the position of a receiving component may be taken into consideration.

In S13, calculate a confidence for each of the intersection in each set of intersections.

Generally, confidence denotes to accuracy, and a confidence level is used to evaluate the accuracy, that is, representing the reliability of an event. In embodiments of the present disclosure, the confidence level is defined as a measurement of a matching level between an actual position of a touch region and intersections in a set of intersections corresponding to the touch region.

From the view that intersections are related to their corresponding touch region, the inventors think that, a confidence level of an intersection in a set of intersections may be related to the number of other intersections in the set.

In some embodiments, the confidence level of a particular intersection in a set of intersections may be defined as the number of other intersections which have distances to the particular intersection less than or equal to a first predetermined distance in the set, where the first predetermined distance is determined based on a control precision of a touch screen micro controller which is related to width of the array of emitting components and the array of receiving components, width of scanning rays (i.e. width of a scanning axis), and a distance between two adjacent emitting components or receiving components. It should be noted that, the first predetermined distance may be related to other factors in other embodiments, which is not limited in the present disclosure.

In the inventors' opinion, to an intersection having a relatively high confidence level, a circular region, where the intersection is taken as a center and a first predetermined distance is taken as a radius, should contain other intersections as many as possible. To an intersection, a sum of the number of other intersections contained in a circular region and an initial value of confidence level of the intersection may be defined as the confidence level of the intersection, where the circular region takes the intersection as a center and a first predetermined distance as a radius. In some embodiments, the initial value of confidence level of the intersection may be 1. In other embodiments, the confidence level of an intersection may be defined in other ways, such as a ratio of the number of other intersections contained in the circular region to all the intersections in the set of intersections.

In S14, perform a coordinate fusion to all the sets of intersections which correspond to the touch region based on the confidence levels to obtain positions of the touch region.

By performing the coordinate fusion to all the sets of intersections which correspond to the touch region, coordinates of the touch region in different axial directions may be obtained.

It should be understood that, the number of axial directions of a touch region on a touch screen is not limited in embodiments of the present disclosure. As shown FIGS. 1 to 4, the touch screen 101 is a two-dimensional structure including a horizontal axis (X-axis) and a vertical axis (Y-axis). In other embodiments, a touch screen may be a three-dimensional structure including an X-axis, a Y-axis and a Z-axis. Therefore, in embodiments of the present disclosure, the touch screen may be two dimensions or a three-dimensional space.

Figure 6:
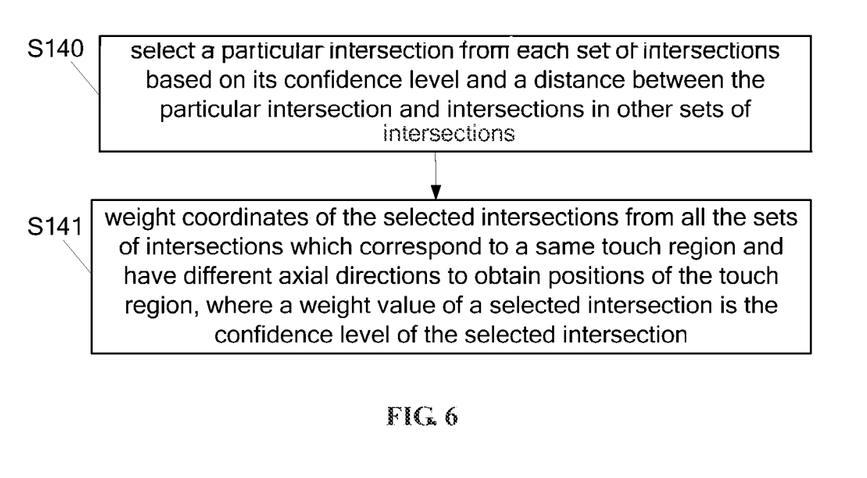
FIG. 6 schematically illustrates a flow chart of S14 in the method for touch identification shown in FIG. 5.

Referring to FIG. 6, performing a coordinate fusion to all the sets of intersections which correspond to the touch region based on the confidence levels to obtain positions of the touch region may include S140 and S141.

In S140, select a particular intersection from each set of intersections based on its confidence level and a distance between the particular intersection and intersections in other sets of intersections.

S140 may include selecting an intersection with a high reliability from each set of intersections and performing a coordinate fusion on all the selected intersections. Coordinate fusion includes: performing conversion on internal coordinates of intersections obtained by a micro controller and obtaining the position of the touch region corresponding to the intersections. The selected intersection with a high reliability in each set may not only have a high confidence level but also have a short distance with intersections in other sets of intersections.

In S140, first, an intersection with a highest confidence level in a set of intersections is selected. If at least two intersections have a same highest confidence level in the set of intersections, a distance between each of the at least two intersections and other intersections which have different axial directions with the at least two intersections may be calculated. One of the at least two intersections, which has the shortest distance with other intersections which have different axial directions with the at least two intersections, is selected as the intersection having highest reliability.

In some embodiments, in S140, selecting a particular intersection from each set of intersections may include: selecting an intersection having a highest confidence level in a set of intersections; and if there are a plurality of intersections having a same highest confidence level in the set of intersections, selecting one from the plurality of intersections which has a shortest distance to intersections having highest confidence level in other sets of intersections.

In S141, weight coordinates of the selected intersections from all the sets of intersections which correspond to a same touch region and have different axial directions to obtain positions of the touch region, where a weight value of a selected intersection is the confidence level of the selected intersection.

In some embodiments, weighting coordinates of the selected intersections from all the sets of intersections which correspond to a same touch region and have different axial directions to obtain positions of the touch region may be performed based on Equation (1).

$$P.k = \sum_{n=1}^{N}(Cn \times Pn.k) \bigg/ \sum_{n=1}^{N} Cn, \quad (1)$$

where P corresponds to a touch region, P.k is a coordinate of the touch region on the k-axis, Pn is a selected intersection which is selected from a $n^{th}$ set of intersections in sets of intersections which correspond to the touch region and have different axial directions, N is the number of the different axial directions, Pn.k is a coordinate of the selected intersection Pn on the k-axis and is a confidence level of the selected intersection Pn.

For example, to the touch screen 101 shown in FIGS. 1 to 4, N=2 and different axes include X-axis and Y-axis, thus, Equation (1) is as follows.

$$P.x=(C1 \times P1.x+C2 \times P2.x)/(C1+C2) \quad (2)$$

$$P.y=(C1 \times P1.y+C2 \times P2.y)/(C1+C2) \quad (3),$$

where P is a touch region, P.x is a coordinate of the touch region P on the X-axis P.y is a coordinate of the touch region P on the Y-axis, P1 is a selected intersection which is selected from a set of intersections corresponding to the touch region P in the X-axis direction, P2 is a selected intersection which is selected from a set of intersections corresponding to the touch region P in the Y-axis direction, P1.x, P1.y are coordinates of the selected intersection P1, P2.x, P2.y are coordinates of the selected intersection P2, and C1, C2 are confidence levels of the selected intersections P1 and P2.

To a three-dimension touch screen, N=3 and different axes include X-axis Y-axis and Z-axis, thus, Equation (1) is as follows.

$$P.x=(C1 \times P1.x+C2 \times P2.x+C3 \times P3.x)/(C1+C2+C3) \quad (4)$$

$$P.y=(C1 \times P1.y+C2 \times P2.y+C3 \times P3.y)/(C1+C2+C3) \quad (5)$$

$$P.z=(C1 \times P1.z+C2 \times P2.z+C3 \times P3.z)/(C1+C2+C3) \quad (6),$$

where P is a touch region, P.x is a coordinate of the touch region P on the X-axis, P.y is a coordinate of the touch region P on the Y-axis, P.z is a coordinate of the touch region P on the Z-axis, P1 is a selected intersection which is selected from a set of intersections corresponding to the touch region P in the X-axis direction, P2 is a selected intersection which is selected from a set of intersections corresponding to the touch region P in the Y-axis direction, P3 is a selected intersection which is selected from a set of intersections corresponding to the touch region P in the Z-axial direction, P1.x, P1.y, P1.z are coordinates of the selected intersection P1, P2.x, P2.y, P2.z are coordinates of the selected intersection P2, P3.x, P3.y, P3.z are coordinates of the selected intersection P3, and C1, C2, C3 are confidence levels of the selected intersections P1, P2 and P3.

Further, in some embodiments, when the coordinate fusion is performed to all the sets of intersections which correspond to a same touch region, coordinates of the intersections may be updated to improve the reliability and accuracy of determining the positions of the touch region. This update process may be performed in S13, including: taking an average value of coordinates of an intersection in a set of intersections and other at least one intersection in the set of intersections as an updated coordinate of the intersection, a distance between the intersection and each of the other at least one intersection in the set being shorter than or equal to a second predetermined distance. Details about the second predetermined distance may be referred to description about the first predetermined distance. In some embodiments, the second predetermined distance is shorter than the first predetermined distance. In practice, the second predetermined distance may be adjusted based on results of the coordinate fusion rather than theoretical values, or the second predetermined distance is set to be equal to the first predetermined distance.

In some embodiments, in consideration of the usefulness of updated coordinates of intersections and data processing efficiency, only coordinates of the selected intersections are updated after selecting the intersections in S140, while coordinates of other intersections are not updated. Specifically, an average value of coordinates of a selected intersection in a set of intersections and other at least one intersection in the set of intersections is taken as an updated coordinate of the selected intersection and a distance between the selected intersection and each of the other at least one intersection in the set is shorter than or equal to a second predetermined distance. In some embodiments, the second predetermined distance may be set to be equal to the first predetermined distance. Afterward, the updated coordinates of the selected intersections in all the sets of intersections which correspond to the touch region are taken into Equation (1) for calculation.

In one embodiment, application process of the above-mentioned method is provided.

Figure 7:
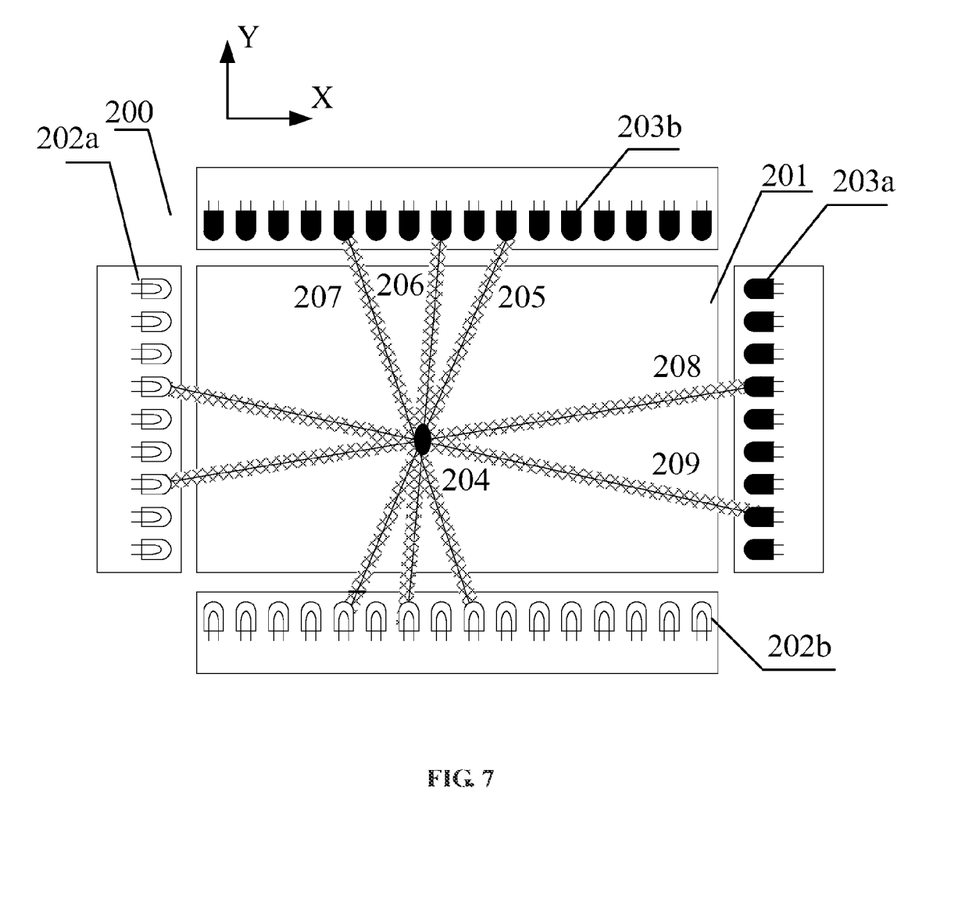
FIG. 7 schematically illustrates a state of the touch device shown in FIG. 1 when in operation, where the method for touch identification shown in FIG. 5 is used.

Referring to FIG. 7, a touch device 200 is provided and hardware structures thereof are similar with the touch device 100 shown in FIG. 1. In the touch device 200, a following method for touch identification is employed. The touch device 200 includes a rectangular touch screen 201, and emitting component arrays (202a, 202b) and receiving component arrays (203a, 203b) which are installed at surrounding edges of the touch device 200.

Since a touch region 204 is a fine touch region, a direct-axis scanning cannot detect it (more related information may be found in description of FIG. 4). Thus, an off-axis scanning is performed to detect the touch region 204.

In S11, recording scanning axes with scanning rays shielded. The recorded scanning axes include scanning axes 208 and 209 in an X-axis direction and scanning axes 205 to 207 in a Y-axis direction.

Figure 8:
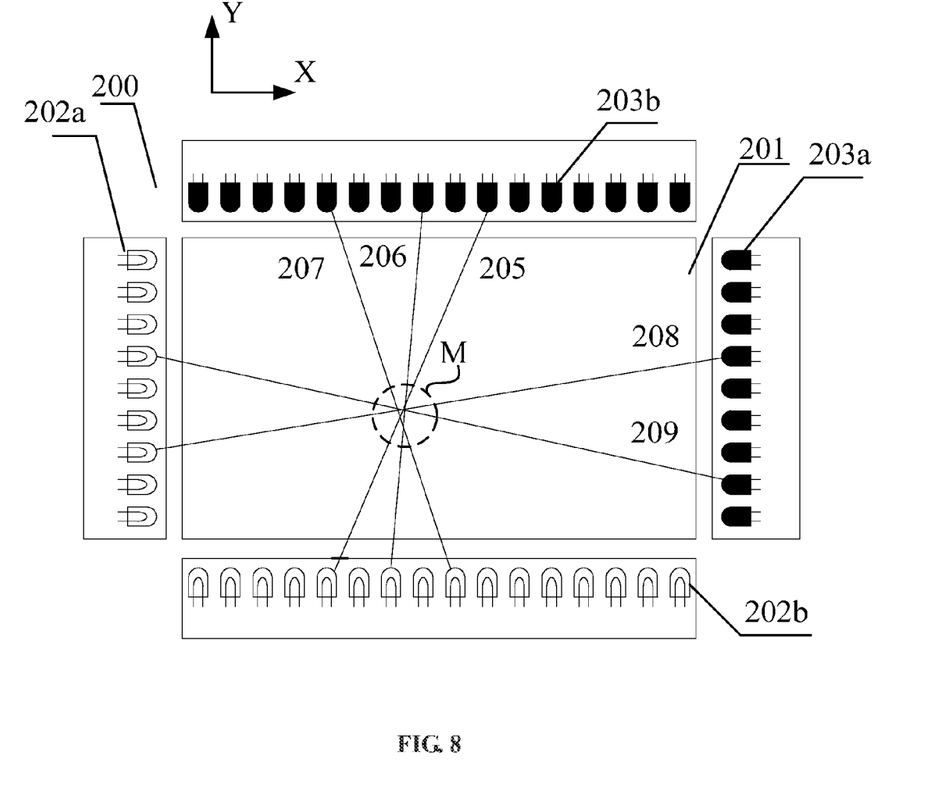
FIG. 8 schematically illustrates central lines of scanning axes shown in FIG. 7.
Figure 9:
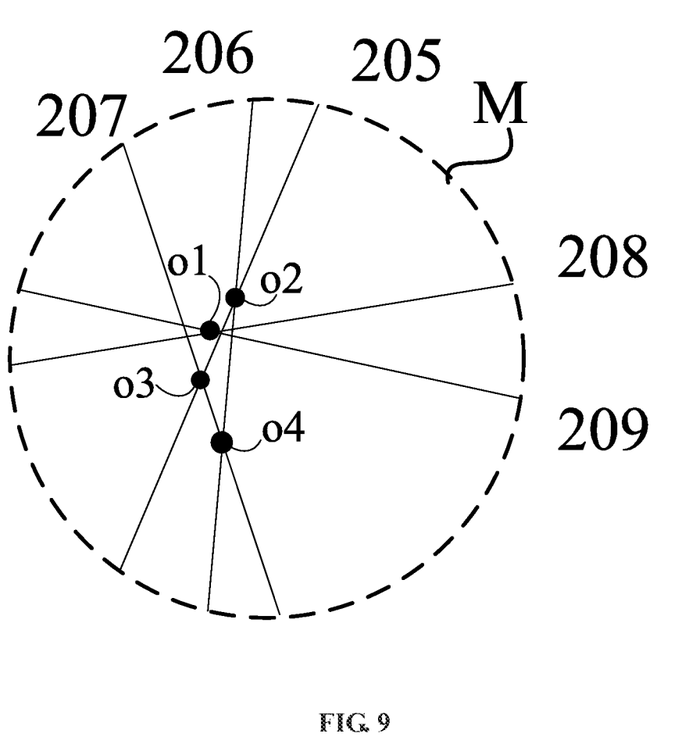
FIG. 9 schematically illustrates an enlarged view of an M part shown in FIG. 8.

In S12, central lines corresponding to the scanning axes 205-207, 208 and 209 are set. FIG. 8 schematically illustrates the central lines and FIG. 9 schematically illustrates an enlarged view of an M part shown in FIG. 8. A set of intersections which correspond to the touch region 204 on the X-axis has one intersection o1 therein, and a set of intersections which correspond to the touch region 204 on the Y-axis has intersections o2 to o4 therein.

Afterward, in S13, confidence levels of the intersections o1 to o4 are calculated. In the embodiment, coordinates of the intersections o1 to o4 are updated in S13.

Referring to FIG. 9, the confidence levels of the intersections o1 to o4 are calculated first. Since the set of intersections on the X-axis only has one intersection o1 therein, the confidence level of the intersection of may be set to be 1 (in other embodiments, the confidence level of the intersection o1 may be set to be 0). Assuming that a distance between the intersections o2 and o3 is shorter than or equal to a first predetermined distance, a distance between the intersections o3 and o4 is shorter than or equal to the first predetermined distance, and a distance between the intersections o2 and o4 is longer than the first predetermined distance, the confidence levels of the intersections o2 to o4 are 2, 3 and 2, respectively. It should be noted that, in the embodiment, an initial value of the confidence level is 1. In some embodiments, the initial value of the confidence level is 0. As a result, during a coordinate confusion process, a weight value may be the initial value of the confidence level plus 1. The confidence levels of the intersections o2 to o4 are 1, 2 and 1, respectively.

Figure 10:
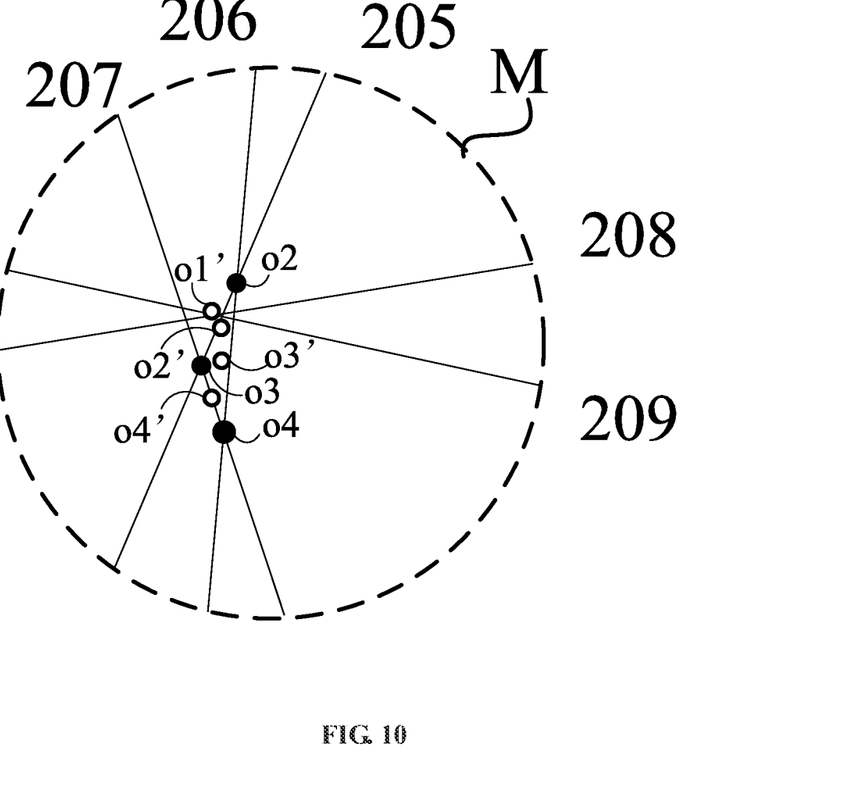
FIG. 10 schematically illustrates coordinates of intersections after update.

When a second predetermined distance is equal to the first predetermined distance, positions of the intersections o1 to o4 after coordinate update are illustrated as intersections o1' to o4' in FIG. 10. The intersection o1' locates in a position of the intersection o1, the intersection o2' locates in a center of a straight line defined by the intersections o2 and o3, the intersection o3' locates in a centroid of a triangle defined by the intersections o2, o3 and o4, and the intersection o4' locates in a center of a straight line defined by the intersections o3 and o4.

In S14, a coordinate fusion is performed to the intersections in the set of intersections in the X-axis direction and the intersections in the set of intersections in the Y-axis direction.

First, select a particular intersection in each set of intersections. For example, the intersection having a highest confidence level is selected. That is, the intersection o3' in the set of intersections in the Y-axis direction and the intersection o1' in the set of intersections in the X-axis direction are selected. In the embodiment, in each set of intersections, only one intersection has the highest confidence level. In other embodiments, if two or more intersections have the same highest confidence level in a set, a distance between each of the two or more intersections and selected intersections in other sets may be taken as a factor in the intersection selection.

Afterward, performing the coordinate fusion to the intersections o1' and o3' based on Equations (2) and (3) above. Here, P corresponds to the touch region 204, P.x is a coordinate of the touch region P on the X-axis, P.y is a coordinate of the touch region P on the Y-axis, P1 is the selected intersection o1' which is selected from the set of intersections corresponding to the touch region P in the X-axis direction, P2 is the selected intersection o3' which is selected from the set of intersections corresponding to the touch region P in the Y-axis direction, P1.x, P1.y are coordinates of the selected intersection o1', P2.x, P2.y are coordinates of the selected intersection o3', and C1, C2 are confidence levels of the selected intersections o1' and o3', 1 and 3, respectively.

Accordingly, in one embodiment, a device for touch identification is provided, including:

a scanning record unit, adapted to perform an axial scanning on a touch screen and when a touch region is detected, record scanning axes with scanning rays shielded;

an intersection unit, adapted to, according to axial directions, obtain sets of intersections of the scanning axes with scanning rays shielded, corresponding to the detected touch region;

a calculation unit, adapted to calculate a confidence level for each of the intersection in each set of intersections; and a coordinate fusion unit, adapted to perform a coordinate fusion to all the sets of intersections which correspond to the touch region based on the confidence levels to obtain positions of the touch region.

In some embodiments, the intersection unit may include: an obtaining unit adapted to obtain lines corresponding to the scanning axes with scanning rays shielded according to axial directions; and an intersection obtaining unit, adapted to obtain intersections of the lines as intersections in sets of intersections corresponding to the touch region.

In some embodiments, the coordinate fusion unit may include: a selection unit, adapted to select a particular intersection from each set of intersections based on its confidence level and a distance between the particular intersection and intersections in other sets of intersections; and a weighting unit, adapted to weight coordinates of the selected intersections from all the sets of intersections which correspond to a same touch region and have different axial directions to obtain positions of the touch region, where the weight value of a selected intersection is the confidence level of the selected intersection. In some embodiments, the selection unit may include: a first sub-selection unit, adapted to select an intersection having a highest confidence level in a set of intersections; and a second sub-selection adapted to select one from a plurality of intersections which has a shortest distance to intersections having highest confidence level in other sets of intersections, if there are the plurality of intersections having a same highest confidence level in the set of intersections.

In one embodiment, a touch screen is provided. The touch screen includes a touch region and a micro processor which includes the device for touch identification described above.

In above embodiments, direct-axis scannings and off-axis scannings are performed in turn and results thereof are processed based on S11 to S14. In the following embodiment, a method for touch identification is provided, where results of direct-axis scannings and off-axis scannings are processed, respectively.

Figure 11:
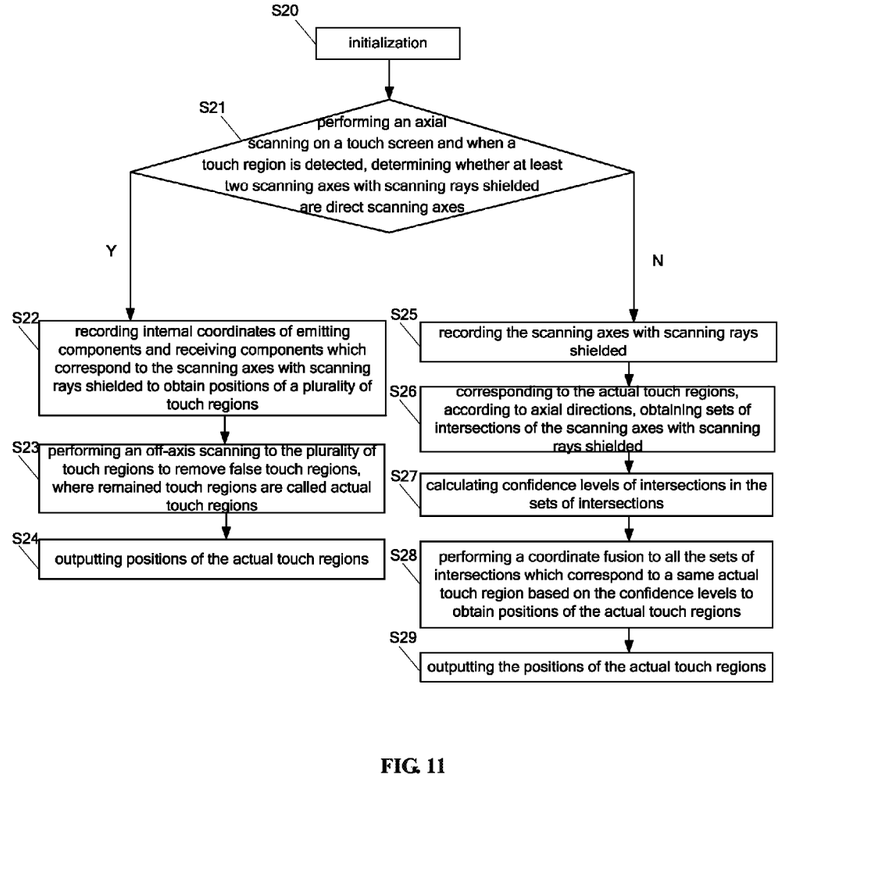
FIG. 11 schematically illustrates a flow chart of a method for touch identification according to one embodiment of the present disclosure.

Referring to FIG. 11, the method for touch identification includes:

S20 initialization;

S21, performing an axial scanning on a touch screen and when a touch region is detected, determining whether at least two scanning axes with scanning rays shielded are direct scanning axes;

S22, recording internal coordinates of emitting components and receiving components which correspond to the scanning axes with scanning rays shielded to obtain positions of a plurality of touch regions;

S23, performing an off-axis scanning to the plurality of touch regions to remove false touch regions, where remained touch regions are called actual touch regions;

S24, outputting; positions of the actual touch regions;

S25, recording the scanning axes with scanning rays shielded;

S26, corresponding to the actual touch regions, according to axial directions, obtaining sets of intersections of the scanning axes with scanning rays shielded;

S27, calculating confidence levels of intersections in the sets of intersections;

S28, performing a coordinate fusion to all the sets of intersections which correspond to a same actual touch region based on the confidence levels to obtain positions of the actual touch regions; and S29, outputting the positions of the actual touch regions.

S21 is performed to determine whether two direct scanning axes exist in the scanning axes with scanning rays shielded, after a cycle of scanning. One direct scanning axis is a scanning axis in a horizontal axis direction, and the other direct scanning axis is a scanning axis in a vertical axis direction. If two direct scanning axes exist in the scanning axes with scanning rays shielded, the touch region is determined to be not fine. To save power consumption and improve processing efficiency, S22 to S24 may be performed. If there are less than two direct scanning axes and a plurality of off scanning axes in different axial directions in the scanning axes with scanning rays shielded, S25 to S29 may be performed. Details about S22 to S24 and S25 to S29 may be found in above description, which are not described in detail here.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed:

1. A method for touch identification, comprising:

performing an axial scanning on a touch screen, and when a touch region is detected, recording scanning axes with scanning rays shielded;

corresponding to the detected touch region, according to axial directions, obtaining sets of intersections of the scanning axes with scanning rays shielded;

calculating a confidence level for each of the intersection in each set of intersections; and performing a coordinate fusion to all the sets of intersections which correspond to the touch region based on the confidence levels to obtain positions of the touch region, wherein a portion of the touch region where a scanning axis locates is a parallelogram region, a base of the parallelogram region is an axial position of the touch region, and an angle between the base and a lateral side of the parallelogram region is a deflection angle of the scanning rays with scanning rays shielded.

2. The method for touch identification according to claim 1, wherein performing an axial scanning on a touch screen comprises:
  initializing arrays of emitting component and arrays of receiving component and determining a number of scanning axis and a scanning deflection angle; and connecting an emitting component and a corresponding receiving component to perform direct-axis scanning or off-axis scanning with the determined number of scanning axis and the determined scanning deflection angle.

3. The method for touch identification according to claim 1, wherein the scanning axes with scanning rays shielded are obtained by recording an axial position corresponding to the touch region.

4. The method for touch identification according to claim 3, wherein the axial position corresponding to the touch region comprises a start position and an end position of the touch region on an axis, or comprises the start position and width of the touch region on the axis, or comprises width and the end position of the touch region on the axis.

5. The method for touch identification according to claim 1, wherein corresponding to the touch region, according to axial directions, obtaining sets of intersections of the scanning axes with scanning rays shielded comprises: for each axial direction, obtaining lines corresponding to the scanning axes with scanning rays shielded; and obtaining intersections of the lines.

6. The method for touch identification according to claim 5, wherein the lines are central lines corresponding to the scanning axes with scanning rays shielded.

7. The method for touch identification according to claim 1, wherein the confidence level of a particular intersection in a set of intersections is related to the number of other intersections in the set which have distances to the particular intersection less than or equal to a first predetermined distance, or related to a ratio of the number of the other intersections in the set which have distances to the particular intersection less than or equal to the first predetermined distance to the number of all the intersections in the set.

8. The method for touch identification according to claim 1, wherein the confidence level of a particular intersection in a set of intersections is a sum of an initial value of the confidence level of the particular intersection and the number of other intersections which have distances to the particular intersection less than or equal to a first predetermined distance in the set.

9. The method for touch identification according to claim 1, wherein performing coordinate fusion to all the sets of intersections which correspond to the touch region based on the confidence levels to obtain positions of the touch region comprises: selecting a particular intersection from each set of intersections based on its confidence level and a distance between the particular intersection and intersections in other sets of intersections; and weighting coordinates of the selected intersections from all the sets of intersections which correspond to a same touch region and have different axial directions to obtain positions of the touch region, where a weight value of a selected intersection is the confidence level of the selected intersection.

10. The method for touch identification according to claim 9, wherein selecting a particular intersection from each set of intersections comprises: selecting an intersection having a highest confidence level in a set of intersections; and if there are a plurality of intersections having a same highest confidence level in the set of intersections, selecting one from the plurality of intersections which has a shortest distance to intersections having highest confidence level in other sets of intersections.

11. The method for touch identification according to claim 9, wherein a coordinate of one of the selected intersections which correspond to a same touch region and have different axial directions is an average value of coordinates of the selected intersection in a set of intersections and other at least one intersection in the set of intersections, where a distance between the intersection and each of the other at least one intersection in the set is shorter than or equal to a second predetermined distance.

12. The method for touch identification according to claim 9, wherein weighting coordinates of the selected intersections from all the sets of intersections which correspond to a same touch region and have different axial directions to obtain positions of the touch region is performed based on following equation:

$$P.k = \sum_{n=1}^{N}(Cn \times Pn.k) \bigg/ \sum_{n=1}^{N} Cn$$

where P corresponds to a touch region, P.k is a coordinate of the touch region on the k-axis, Pn is a selected intersection which is selected from a $n^{th}$ set of intersections in sets of intersections which correspond to the touch region and have different axial directions, N is the number of the different axial directions, Pn.k is a coordinate of the selected intersection Pn on the k-axis, and Cn is a confidence level of the selected intersection Pn.

13. The method for touch identification according to claim 10, wherein weighting coordinates of the selected intersections from all the sets of intersections which correspond to a same touch region and have different axial directions to obtain positions of the touch region is performed based on following equation:

$$P.k = \sum_{n=1}^{N}(Cn \times Pn.k) \bigg/ \sum_{n=1}^{N} Cn$$

where P corresponds to a touch region, P.k is a coordinate of the touch region on the k-axis, Pn is a selected intersection which is selected from a $n^{th}$ set of intersections in sets of intersections which correspond to the touch region and have different axial directions, N is the number of the different axial directions, Pn.k is a coordinate of the selected intersection Pn on the k-axis, and Cn is a confidence level of the selected intersection Pn.

14. A device for touch identification, comprising:
  a scanning record unit, adapted to perform an axial scanning a touch screen and when a touch region is detected, record scanning axes with scanning rays shielded;
  an intersection unit, adapted to, according to axial directions, obtain sets of intersections of the scanning axes with scanning rays shielded, corresponding to the detected touch region;
  a calculation unit, adapted to calculate a confidence level for each of the intersection in each set of intersections; and
  a coordinate fusion unit, adapted to perform a coordinate fusion to all the sets of intersections which correspond to the touch region based on the confidence levels to obtain positions of the touch region.

15. The device for touch identification according to claim 14, wherein the intersection unit comprises:
an obtaining unit, adapted to obtain at least one axial line of the scanning axes where scanning rays are shielded and which have a same axial direction; and
an intersection obtaining unit, adapted to take intersections of the at least one axial lines as intersections in a set of intersections.

16. The device for touch identification according to claim 14, wherein the confidence level of a particular intersection in a set of intersections is a sum of an initial value of the confidence level of the particular intersection and the number of other intersections which have distances to the particular intersection less than or equal to a first predetermined distance in the set.

17. The device for touch identification according to claim 14, wherein the coordinate fusion unit comprises:
a selection unit, adapted to select a particular intersection from each set of intersections based on its confidence level and a distance between the particular intersection and intersections in other sets of intersections; and
a weighting unit, adapted to weight coordinates of the selected intersections from all the sets of intersections which correspond to a same touch region and have different axial directions to obtain positions of the touch region, where a weight value of a selected intersection is the confidence level of the selected intersection.

18. The device for touch identification according to claim 17, wherein the selection unit comprises:
a first sub-selection unit, adapted to select an intersection having a highest confidence level in a set of intersections; and
a second sub-selection unit, adapted to select one from a plurality of intersections which has a shortest distance to intersections having highest confidence level in other sets of intersections, if the plurality of intersections have a same highest confidence level in the set of intersections.

19. A touch screen, comprising a touch region and a micro processor, where the micro processor comprises a device for touch identification according to claim 14.

* * * * *